(12) United States Patent
Park

(10) Patent No.: US 6,415,586 B1
(45) Date of Patent: Jul. 9, 2002

(54) YARD TRIMMING SYSTEM FOR ATTACHMENT TO A VEHICLE

(76) Inventor: John A. Park, 1031 240th St., Fort Scott, KS (US) 66701

( * ) Notice: Subject to any disclaimer, the term of this patent is extended or adjusted under 35 U.S.C. 154(b) by 0 days.

(21) Appl. No.: 09/815,724

(22) Filed: Mar. 23, 2001

(51) Int. Cl.⁷ .............................................. A01D 34/00
(52) U.S. Cl. ....................................... 56/12.7; 56/12.1
(58) Field of Search ................................ 56/12.7, 12.1, 56/17.1, 17.2, 13.6, 13.7, 295; 30/276; D15/14

(56) References Cited

U.S. PATENT DOCUMENTS

| | | | |
|---|---|---|---|
| 3,183,651 A | * 5/1965 | Hoefler ........................ | 56/11.8 |
| 3,668,845 A | * 6/1972 | Parker .......................... | 56/11.6 |
| 4,703,613 A | * 11/1987 | Raymond ..................... | 56/12.7 |
| 4,949,536 A | 8/1990 | Neufeld | |
| D311,009 S | 10/1990 | Wilkins | |
| 5,040,360 A | * 8/1991 | Meehleder .................... | 56/11.6 |
| 5,167,108 A | 12/1992 | Bird | |
| D334,200 S | 3/1993 | Clifton | |
| 5,226,284 A | 7/1993 | Meehleder | |
| 5,313,770 A | * 5/1994 | Smothers ..................... | 56/12.7 |
| 5,560,189 A | 10/1996 | Devillier et al. | |
| 5,577,374 A | * 11/1996 | Huston ........................ | 56/12.1 |
| 5,862,655 A | * 1/1999 | Altamirano et al. ......... | 56/12.1 |
| 6,085,503 A | * 7/2000 | Hutchinson ................. | 56/12.7 |
| 6,158,129 A | * 12/2000 | Klein ........................... | 30/276 |
| 6,256,970 B1 | * 7/2001 | Fleener ........................ | 56/12.7 |
| D449,622 S | * 10/2001 | Csonka et al. ................ | D15/4 |

* cited by examiner

*Primary Examiner*—Robert E. Pezzuto
*Assistant Examiner*—Árpád Fábián Kovács

(57) ABSTRACT

A yard trimming system for attaching to an undercarriage of a lawn tractor. The yard trimming system includes a cutting assembly for cutting plants growing from a ground surface. The cutting assembly comprises a sleeve member and a disk member rotatably mounted to a second end of the sleeve member. A pair of cutting members is mounted on a perimeter edge of the disk for cutting the plants. A mounting assembly is provided for pivotally mounting the cutting assembly to the undercarriage of the vehicle. The mounting assembly preferably comprises a support member with the sleeve member being mounted on a first end of the support member. A pulley assembly is mounted on the support member for selectively providing power from a motor of the vehicle to the cutting assembly.

14 Claims, 4 Drawing Sheets

YARD TRIMMING SYSTEM FOR ATTACHMENT TO A VEHICLE

BACKGROUND OF THE INVENTION

1. Field of the Invention

The present invention relates to trimming systems and more particularly pertains to a new yard trimming system for attaching to an undercarriage of a vehicle such as a lawn tractor.

2. Description of the Prior Art

The use of trimming systems is known in the prior art. More specifically, trimming systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,560,189; U.S. Pat. No. 4,949,536; U.S. Pat. No. 5,226,284; U.S. Patent No. 5,167,108; U.S. Pat. No. Des. 334,200; and U.S. Pat. No. Des. 311,009.

While these devices fulfill their respective, particular objectives and requirements, the aforementioned patents do not disclose a new yard trimming system. The inventive device includes a cutting assembly for cutting plants growing from a ground surface. The cutting assembly preferably comprises a sleeve member and a disk member rotatably mounted to a second end of the sleeve member. A pair of cutting members is mounted on a perimeter edge of the disk for cutting the plants. A mounting assembly is provided for pivotally mounting the cutting assembly to the undercarriage of the vehicle. The mounting assembly preferably comprises a support member with the sleeve member being mounted on a first end of the support member. A pulley assembly is mounted on the support member for selectively providing power from a motor of the vehicle to the cutting assembly.

In these respects, the yard trimming system according to the present invention substantially departs from the conventional concepts and designs of the prior art, and in so doing provides an apparatus primarily developed for the purpose of attaching to an undercarriage of a vehicle such as a lawn tractor.

SUMMARY OF THE INVENTION

In view of the foregoing disadvantages inherent in the known types of trimming systems now present in the prior art, the present invention provides a new yard trimming system construction wherein the same can be utilized for attaching to an undercarriage of a vehicle such as a lawn tractor.

The general purpose of the present invention, which will be described subsequently in greater detail, is to provide a new yard trimming system apparatus and method which has many of the advantages of the trimming systems mentioned heretofore and many novel features that result in a new yard trimming system which is not anticipated, rendered obvious, suggested, or even implied by any of the prior art trimming systems, either alone or in any combination thereof.

To attain this, the present invention generally comprises a cutting assembly for cutting plants growing from a ground surface. The cutting assembly preferably comprises a sleeve member and a disk member rotatably mounted to a second end of the sleeve member. A pair of cutting members is mounted on a perimeter edge of the disk for cutting the plants. A mounting assembly is provided for pivotally mounting the cutting assembly to the undercarriage of the vehicle. The mounting assembly preferably comprises a support member with the sleeve member being mounted on a first end of the support member. A pulley assembly is mounted on the support member for selectively providing power from a motor of the vehicle to the cutting assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new yard trimming system apparatus and method which has many of the advantages of the trimming systems mentioned heretofore and many novel features that result in a new yard trimming system which is not anticipated, rendered obvious, suggested, or even implied by any of the prior art trimming systems, either alone or in any combination thereof.

It is another object of the present invention to provide a new yard trimming system which may be easily and efficiently manufactured and marketed.

It is a further object of the present invention to provide a new yard trimming system which is of a durable and reliable construction.

An even further object of the present invention is to provide a new yard trimming system which is susceptible of a low cost of manufacture with regard to both materials and labor, and which accordingly is then susceptible of low prices of sale to the consuming public, thereby making such yard trimming system economically available to the buying public.

Still yet another object of the present invention is to provide a new yard trimming system which provides in the apparatuses and methods of the prior art some of the advantages thereof, while simultaneously overcoming some of the disadvantages normally associated therewith.

Still another object of the present invention is to provide a new yard trimming system for attaching to an undercarriage of a vehicle such as a lawn tractor.

Yet another object of the present invention is to provide a new yard trimming system which includes a cutting assembly for cutting plants growing from a ground surface. The cutting assembly preferably comprises a sleeve member and a disk member rotatably mounted to a second end of the sleeve member. A pair of cutting members is mounted on a perimeter edge of the disk for cutting the plants. A mounting assembly is provided for pivotally mounting the cutting assembly to the undercarriage of the vehicle. The mounting assembly preferably comprises a support member with the sleeve member being mounted on a first end of the support member. A pulley assembly is mounted on the support member for selectively providing power from a motor of the vehicle to the cutting assembly.

Still yet another object of the present invention is to provide a new yard trimming system that saves a user time and energy by allowing a user to mow their lawn and trim their weeds with a single device. The present invention does not require a user to carrying around a separate device to trim their weeds.

Even still another object of the present invention is to provide a new yard trimming system that allows users having difficulty walking to trim their weeds with the same device as their riding lawn tractor.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
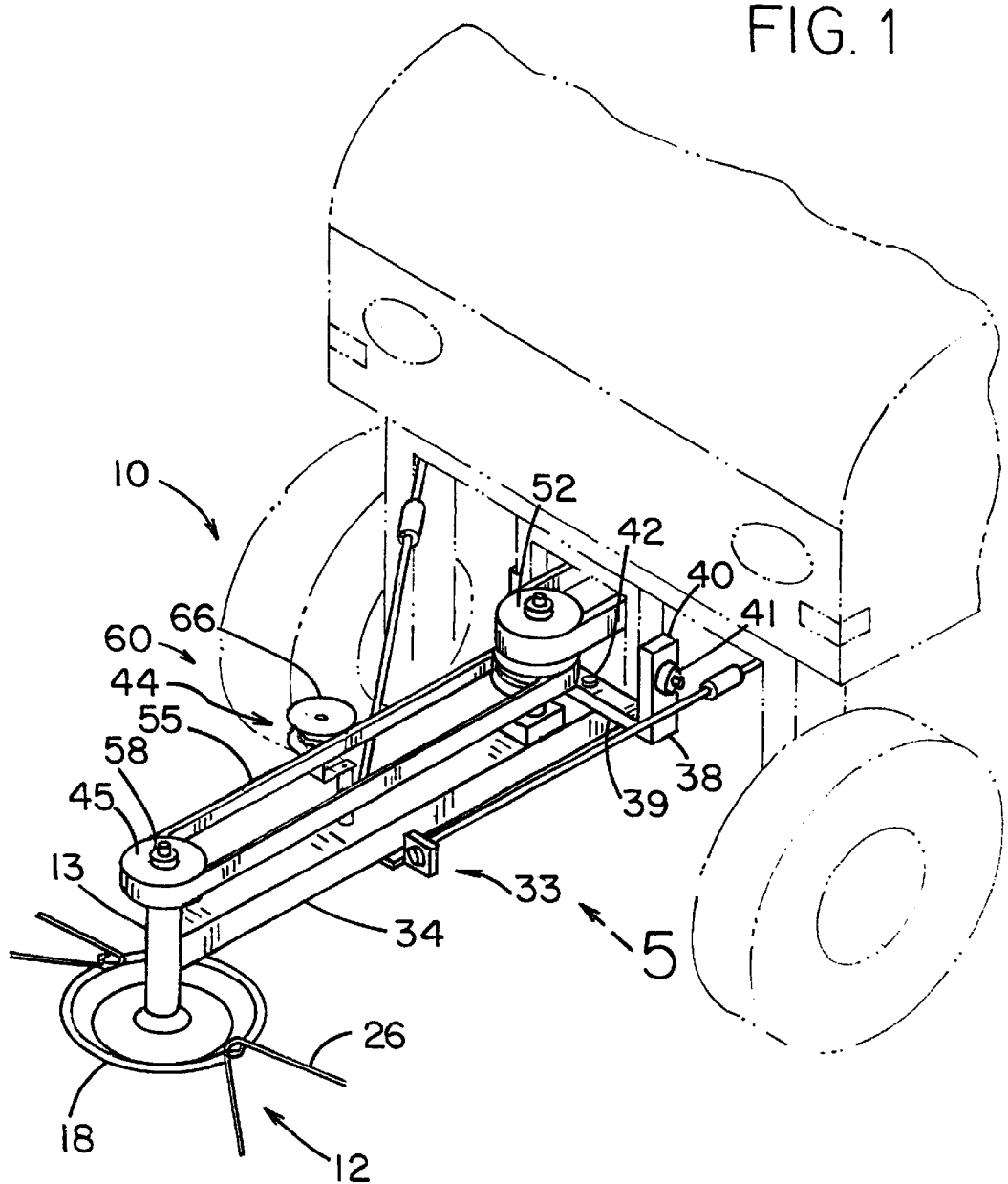
FIG. 1 is a schematic perspective view of a new yard trimming system according to the present invention.

With reference now to the drawings, and in particular to FIGS. 1 through 6 thereof, a new yard trimming system embodying the principles and concepts of the present invention and generally designated by the reference numeral 10 will be described.

As best illustrated in FIGS. 1 through 6, the yard trimming system 10 generally comprises a cutting assembly 12 for cutting plants growing from a ground surface. As particularly illustrated in FIGS. 3 and 4, the cutting assembly 12 preferably comprises a sleeve member 13 that has a first end 14, a second end 15 and a peripheral wall 16 extending between the first 14 and second 15 ends of the sleeve member 13.

A disk member 18 is rotatably coupled to the sleeve member 13. The disk member 18 preferably includes an upper surface 19, a lower surface 20 and a perimeter edge 21. The disk member 18 includes a perimeter bend 23 therein such that the perimeter edge 21 extends in an upwardly direction away from a central portion of the disk member 18 such that the perimeter edge 21 does not engage the ground surface while it rotates. The perimeter bend 23 is preferably positioned generally adjacent to the perimeter edge 21. The disk member 18 may include a collar portion 24 formed on the upper surface 20 of the disk member 18. The collar portion 24 is centrally positioned on the disk member 18. A top side 25 of the collar portion 24 abuts the second end 15 of the sleeve member 13. The disk member 18 lies in a plane orientated generally perpendicular to a longitudinal axis of the sleeve member 13.

Figure 2:
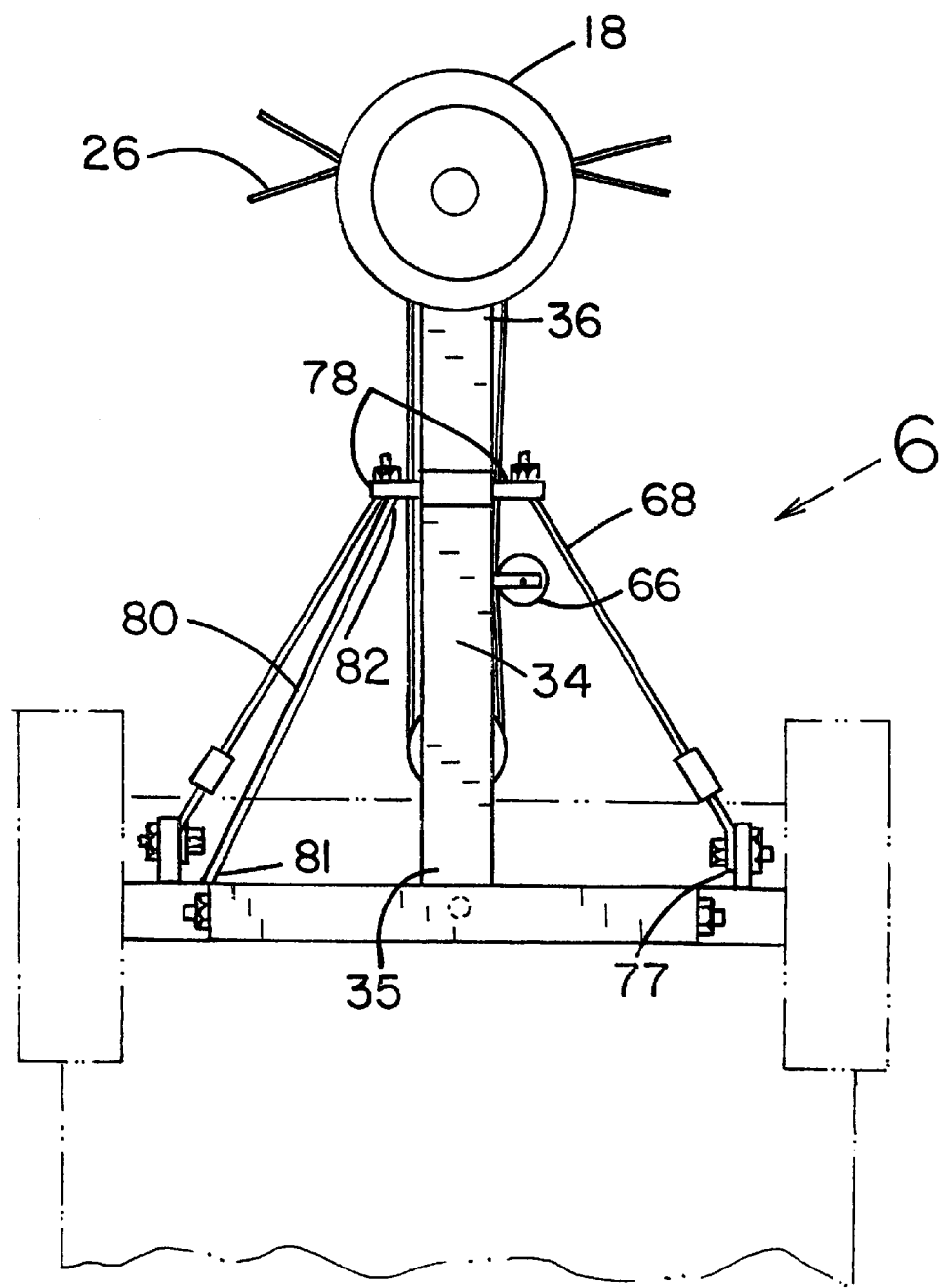
FIG. 2 is a schematic frontal view of the present invention.
Figure 3:
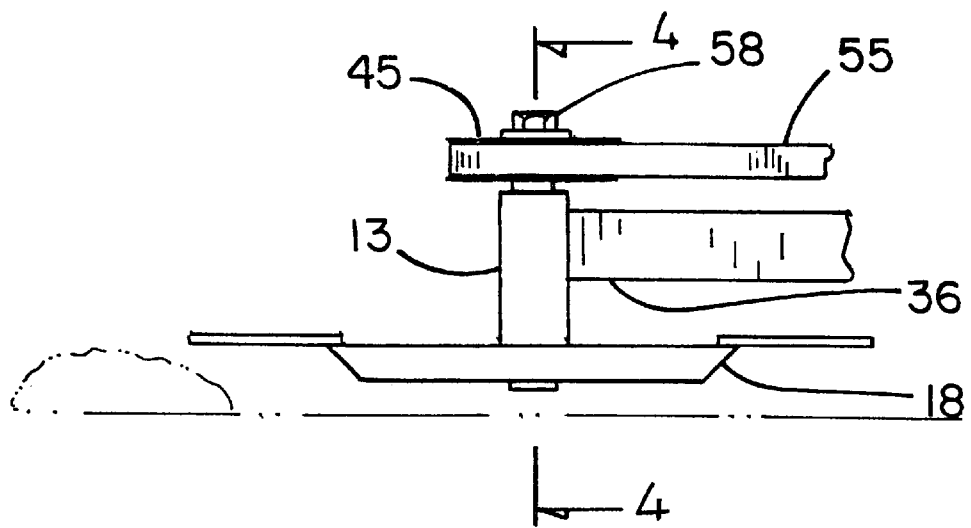
FIG. 3 is a schematic frontal view of the present invention showing a cutting assembly mounted on an end of a support member.
Figure 4:
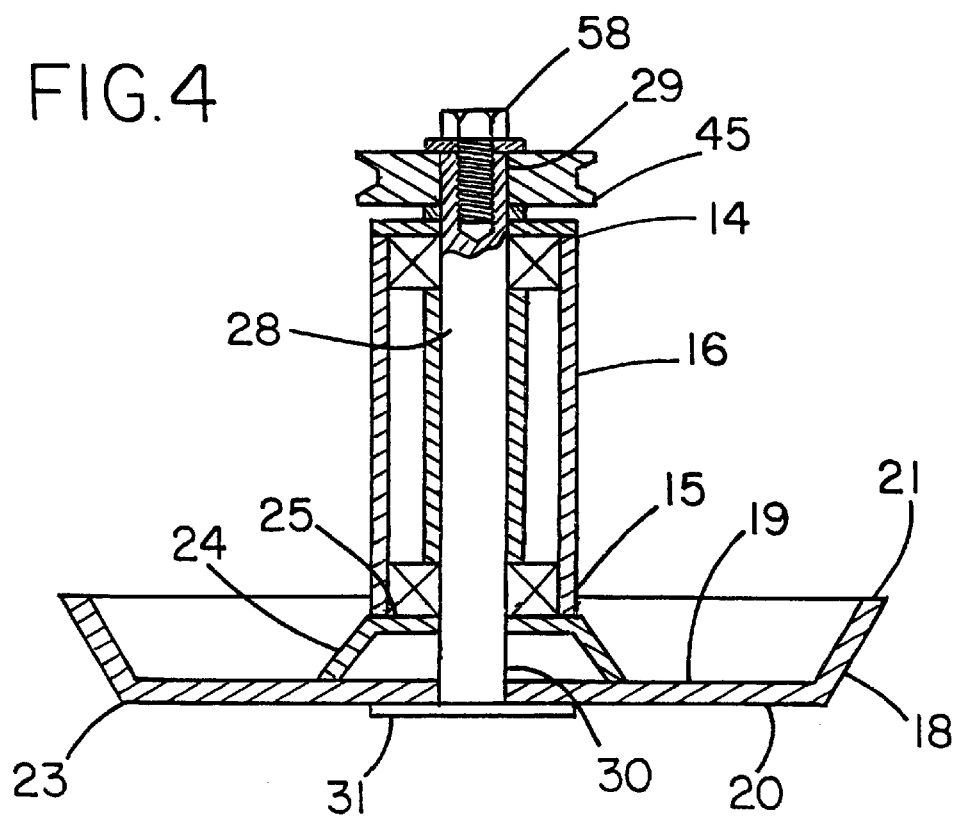
FIG. 4 is a schematic cross-sectional view of the present invention taken along line 4—4 of FIG. 3.

As illustrated in FIGS. 1, 2 and 3, a pair of cutting members 26 is provided for cutting the weeds. Each of the cutting members 26 is mounted on the perimeter edge 21 of the disk member 18. Each of the cutting members 26 is preferably positioned on the disk member 18 such that they are diametrically opposed. Each of the cutting members 26 may comprise a plurality of generally rigid filaments.

A first shaft 28 is provided for rotatably coupling the disk member 18 to the sleeve member 13. The first shaft 28 is rotatably mounted in the sleeve member 13 and a first end 29 of the first shaft 28 extends outwardly from the first end 14 of the sleeve member 13. A second end 30 of the first shaft 28 extends outwardly through the second end 15 of the sleeve member 13 and through the collar portion 24 and the disk member 13. The second end 30 of the first shaft 28 may include a plate portion 31 formed thereon and coupled to the lower surface 20 of the disk member 18.

As particularly illustrated in FIGS. 1 and 2, a mounting assembly 33 is provided for pivotally mounting the cutting assembly 12 to the undercarriage of the vehicle. The mounting assembly 33 preferably comprises an elongated support member 34 for coupling the cutting assembly 12 to the undercarriage of the vehicle. The support member 34 includes a first end 35 and a second end 36. The first end 35 of the support member 34 is pivotally mountable to the undercarriage of the vehicle. The peripheral wall 16 of the sleeve member 13 is mounted to the second end 36 of the support member 34. The support member 34 is positioned generally nearer the first end 14 of the sleeve member 13 than the second end 15 of the sleeve member 13.

As particularly illustrated in FIG. 1, a mounting bracket 38 is provided for pivotally mounting the second end 35 of the support member 33 to the undercarriage of the vehicle. The mounting bracket 38 includes a base portion 39 and a pair of leg portions 40. Each of the leg portions 40 extends upwardly from a respective end of the base portion 39. Each of the leg portions 40 is mountable to the undercarriage of the vehicle. The second end 15 of the support member 13 is pivotally coupled to the base portion 39. The mounting bracket 38 may have a generally U-shape.

A pair of securing members 41 may be provided for removably connecting the mounting bracket 38 to the undercarriage of the vehicle. Each of the securing members 41 preferably extends through one of the leg portions 40 and is removably mountable to the undercarriage of the vehicle. Each of the securing members 41 may comprise a bolt.

A pin 42 may be provided for pivotally coupling the support member 34 to the base portion 39 of the mounting bracket 38. The pin 42 preferably extends through the base portion 39 of the mounting bracket 38 and is pivotally mounted in the support member 34.

A pulley assembly 44 is provided for selectively providing power from a motor of the vehicle to the cutting assembly 12. The pulley assembly 44 preferably comprises a primary driven pulley 45 that is mounted on the first shaft 28. The primary driven pulley 45 may be positioned generally adjacent to the first end 29 of the first shaft 28. A second shaft 46 may be rotatably mounted on the support member 34. The second shaft 46 includes a first end 47 and a second end 48. The second end 48 of the second shaft 46 preferably extends vertically through a top 49 and bottom 50 surface of the support member 34.

A secondary driven pulley 52 may be operationally couplable to the motor of the vehicle. The secondary driven pulley 52 is preferably mounted on the second shaft 46 and positioned generally adjacent to the first end 47 of the second shaft 46. A drive pulley 53 may be mounted on the second shaft 46 and positioned generally between the secondary driven pulley 52 and the support member 34.

Figure 5:
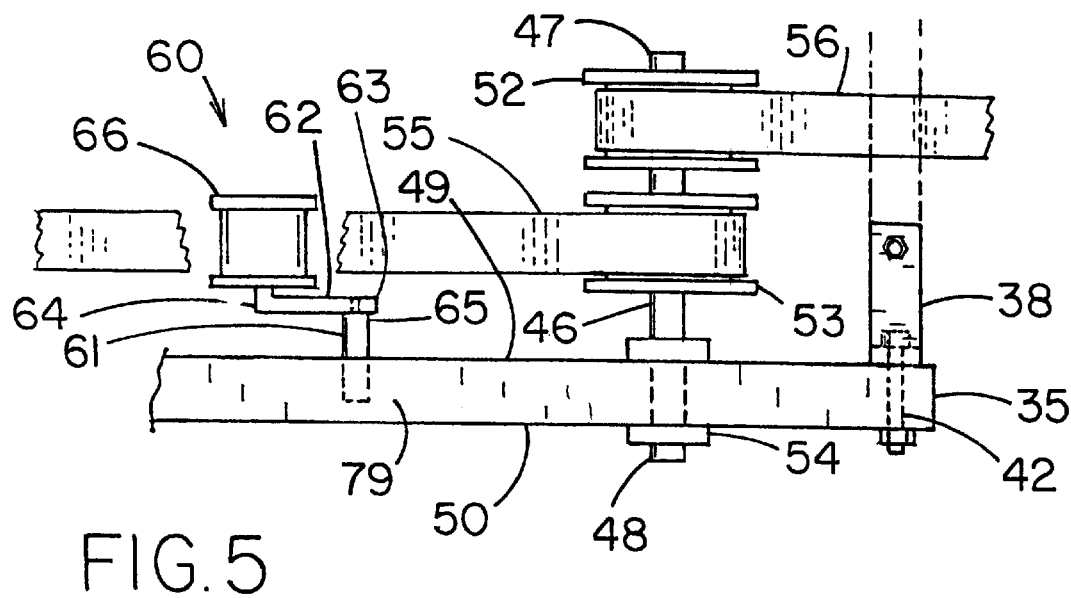
FIG. 5 is a schematic frontal view of the present invention showing a pulley assembly.
Figure 6:
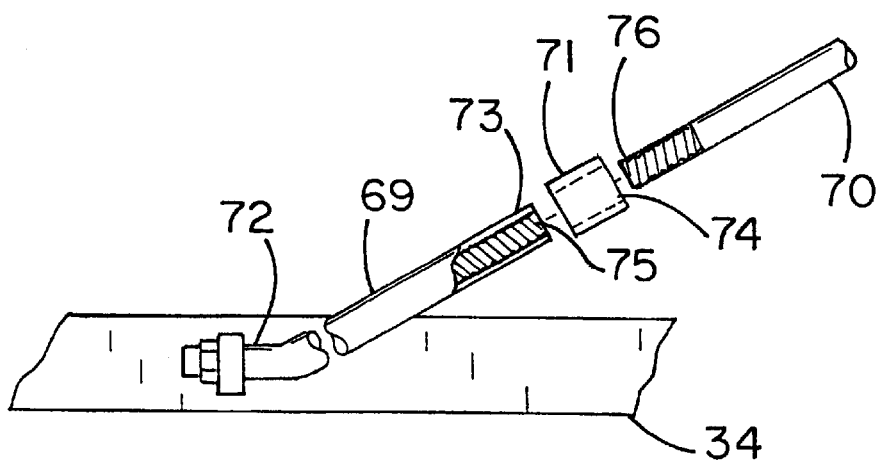
FIG. 6 is a schematic cross-sectional view of the present invention taken along line 6—6 of FIG. 2.

As illustrated in FIG. 5, a clutch means 54 may be provided for rotating the second shaft 46 when the motor of the vehicles turns at a speed exceeding an idle speed. The clutch means 54 is mounted on the support member 34 and is coupled to the second end 48 of the second shaft 46. The clutch means 54 may comprise a centrifugal clutch.

A first belt 55 is mounted on the drive pulley 53 and the primary driven pulley 45. A second belt 56 is mounted on the secondary driven pulley 52 and is operationally couplable to a motor pulley of the motor of the vehicle for transmitting rotation of the drive pulley 53 to the primary driven pulley 45.

A fastening member 58 may be provided for fastening the primary driven pulley 45 to the first end 29 of the first shaft 28. The fastening member 58 may extend through a central portion of the primary driven pulley 45 and is removably mounted in the first end 29 of the first shaft 28. The fastening member 58 may comprise a screw.

A tension pulley assembly 60 may be provided for selectively providing tension on the first belt 56. The tension pulley assembly 60 may comprise a post 61 that is mounted on the support member 34. The post 61 is preferably positioned generally an equal distance between the first 28 and second 46 shafts. The post 61 is preferably orientated generally parallel to the first 28 and second 46 shafts. An arm member 62 having a first end 63 and a second end 64 with the first end 63 being pivotally coupled to an end 65 of the post 61. The arm member 62 is preferably orientated generally perpendicular to the post member 61.

A tension pulley 66 is mounted on the second end 64 of the arm member 62. In one embodiment of the present invention, the arm member 62 is pivotally positionable such that the tension pulley 66 selectively abuts and places tension on a portion of the first belt 55.

As illustrated in FIG. 1, at least one adjuster bar 68 may be provided for moving the second end 36 of the support member 34 in vertical direction with respect to a ground surface. The adjuster bar 68 preferably includes a first portion 69 and a second portion 70 telescoping and an adjuster portion 71. In one embodiment of the present invention, as particularly illustrated in FIG. 6, the first portion 69 has a first end 72 and a second end 73. The first end 72 of the first portion 69 is pivotally mounted to the support member 34. The second end 73 of the first portion 69 includes a hole 74 extending into an interior 75 of the first portion 69.

The second portion 70 may have a first end 76 and a second end 77. The first end 76 of the second portion 70 is positioned in the interior 75 of the first portion 69. The second end 77 of the second portion 70 is mountable to the undercarriage of the vehicle such as a lawn tractor.

The adjuster portion 71 is movably mounted on the second end 73 of the first portion 69 and is threadedly coupled to the second portion 70 such that rotational movement of the adjuster portion 71 causes the second portion 70 to move telescopically with respect to the first portion 69. In one embodiment of the present invention, as particularly illustrated in FIG. 2, a pair of the adjuster bars 68 is provided.

As illustrated in FIG. 2, a pair of flanges 78 may be provided for connecting the first end 72 of each of the first portions 69 of the adjuster bars 68 to the support member 34. Each of the flanges 78 is mounted on a respective side surface 79 of the support member 34. Each of the flanges 78 may be positioned generally an equal distance between the drive pulley 53 and the primary driven pulley 45.

As illustrated in FIG. 2, a rod 80 may be provided for stabilizing the support member 34. The rod 80 includes a first end 81 and a second end 82. The first end 81 of the rod 80 is pivotally mounted to one of the leg portions 40 of the mounting bracket 38. The second end 82 of the rod 80 is pivotally mounted to one of the flanges 78. A longitudinal axis of the rod 80 is preferably orientated generally parallel to a longitudinal axis of one of the adjuster bars 68.

In use, rotation of the motor pulley of the motor of the vehicle rotates the secondary driven pulley 52, which rotates the second shaft 46 causing the drive pulley 53 to rotate. The first belt 55 rotates the primary driven pulley 45 causing the first shaft 28 to rotate the disk member 18.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A yard trimming system attachable to an undercarriage of a vehicle, said device comprising:
   a cutting assembly for cutting plants growing from a ground surface, said cutting assembly comprising:
   a sleeve member;

a disk member rotatably mounted to a second end of said sleeve member;

a pair of cutting members mounted on a perimeter edge of said disk for cutting the weeds;

a mounting assembly for pivotally mounting said cutting assembly to the undercarriage of the vehicle, said mounting assembly comprising a support member with first and second ends, said sleeve member being mounted on said second end of said support member; and a pulley assembly mounted on said support member for selectively providing power from a motor of the vehicle to said cutting assembly; and a rod for stabilizing said support member, said rod having a first end and a second end, said first end of said rod being pivotally mounted to one of a pair of leg portions of a mounting bracket of said mounting assembly, said second end of said rod being pivotally mounted to one of a pair of flanges mounted on said support member.

2. The yard trimming system of claim 1, wherein said disk member has a perimeter bend therein such that a perimeter edge portion of said disk member extends in an upwardly direction away from a central portion of said disk member.

3. The yard trimming system of claim 2, wherein said disk member has a collar portion formed on said upper surface of said disk member, a top side of said collar portion abutting said second end of said sleeve member.

4. The yard trimming system of claim 3, additionally including a first shaft for rotatably coupling said disk member to said sleeve member, said first shaft being rotatably mounted in said sleeve member, an end of said first shaft extending outwardly through said second end of said sleeve, said second end of said first shaft having a plate portion formed thereon and coupled to said lower surface of said disk member.

5. The yard trimming system of claim 1, wherein said first end of said support member is pivotally mountable to the undercarriage of the vehicle, said sleeve member having a peripheral wall being mounted to a second end of said support member.

6. The yard trimming system of claim 5, additionally including a mounting bracket for pivotally mounting said first end of said support member to the undercarriage of the vehicle, said mounting bracket having a base portion and a pair of leg portions, wherein each of said leg members is mountable to the undercarriage of the vehicle and said second end of said support member being pivotally coupled to said base portion.

7. The yard trimming system of claim 6, additionally including a pair of securing members for removably connecting said mounting bracket to the undercarriage of the vehicle, each of said securing members extending through one of said leg portions and being removably mountable to the undercarriage of the vehicle.

8. The yard trimming system of claim 6, additionally including a pin for pivotally coupling said support member to said base portion of said mounting bracket, said pin extending through said base portion of said mounting bracket and being pivotally mounted in said support member.

9. A yard trimming system attachable to an undercarriage of a vehicle, said device comprising:

a cutting assembly for cutting plants growing from a ground surface, said cutting assembly comprising:
a sleeve member;
a disk member rotatably mounted to a second end of said sleeve member;
a pair of cutting members mounted on a perimeter edge of said disk for cutting the weeds;

a mounting assembly for pivotally mounting said cutting assembly to the undercarriage of the vehicle, said mounting assembly comprising a support member with first and second ends, said sleeve member being mounted on said second end of said support member;

a pulley assembly mounted on said support member for selectively providing power from a motor of the vehicle to said cutting assembly; and at least one adjuster bar for moving said second end of said support member vertically with respect to a ground surface, said adjuster bar having a pair of opposite ends, one of said ends being mountable to the undercarriage of the vehicle, one of said ends being mounted to said support member;

wherein said adjuster bar has a first portion and a second portion telescoping and an adjuster portion;

wherein said first portion has a first end and a second end, said first end of said first portion being pivotally mounted to said support member, a second end of said first portion having a hole extending into an interior of said first portion; and wherein said second portion has a first end and a second end, said first end of said second portion being positioned in said interior of said first portion, said second end of said second portion being mountable to the undercarriage of the vehicle; and wherein said adjuster portion is movably mounted on said second end of said first portion, said adjuster portion being threadedly coupled to said second portion such that rotational movement of said adjuster portion causes said second portion to move telescopically with respect to said second portion.

10. The yard trimming system of claim 9, wherein a pair of said adjuster bars is provided.

11. The yard trimming system of claim 10, additionally including a pair of flanges for connecting said first end of each of said first portions of said adjuster bars to said support member, each of said flanges being mounted on a respective side surface of said support member.

12. A yard trimming system attachable to an undercarriage of a vehicle, said device comprising:

a cutting assembly for cutting plants growing from a ground surface, said cutting assembly comprising:
a sleeve member;
a disk member rotatably mounted to a second end of said sleeve member;
a pair of cutting members mounted on a perimeter edge of said disk for cutting the weeds;

a mounting assembly for pivotally mounting said cutting assembly to the undercarriage of the vehicle, said mounting assembly comprising a support member with first and second ends, said sleeve member being mounted on said second end of said support member;

a pulley assembly mounted on said support member for selectively providing power from a motor of the vehicle to said cutting assembly; and wherein said pulley assembly comprises:
a primary driven pulley mounted on a first shaft extending through said sleeve member; and
a first belt mounted on said primary driven pulley and operationally coupleable to a motor pulley of the motor of the vehicle;

a second shaft being rotatably mounted on said support member;

a secondary driven pulley being mounted on said second shaft, said secondary driven pulley being positioned generally adjacent to a first end of said second shaft;

a drive pulley being mounted on said second shaft and positioned between said secondary driven pulley and said support member, said first belt being mounted on said primary driven pulley and said drive pulley; and a second belt being mounted on said secondary driven pulley and said motor pulley for transmitting rotation of said secondary drive pulley to said primary driven pulley.

13. The yard trimming system of claim 12, additionally including a clutch means for rotating said second shaft when the motor of the vehicles turns at a speed exceeding an idle speed, said clutch means being mounted on said support member and coupled to said second end of said second shaft.

14. The yard trimming system of claim 12, additionally including a tension pulley assembly for selectively providing tension on said first belt, said tension pulley assembly comprising:

a post being mounted on said support member;

an arm member being pivotally coupled to an end of said post;

a tension pulley being mounted on an end of said arm; and wherein said arm is pivotally moved such that said tension pulley selectively abuts and places tension on a portion of said first belt.

* * * * *